US011277462B2

(12) United States Patent
Sivakumar et al.

(10) Patent No.: US 11,277,462 B2
(45) Date of Patent: Mar. 15, 2022

(54) CALL MANAGEMENT OF 5G CONFERENCE CALLS (71) Applicant: International Business Machines Corporation, Armonk, NY (US)

(72) Inventors: Gandhi Sivakumar, Bentleigh (AU); Lynn Kwok, Bundoora (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/928,643

(22) Filed: Jul. 14, 2020

(65) Prior Publication Data
US 2022/0021724 A1 Jan. 20, 2022

(51) Int. Cl.
*H04L 29/06* (2006.01)
*H04L 65/80* (2022.01)
(Continued)

(52) U.S. Cl.
CPC ............ *H04L 65/80* (2013.01); *H04L 65/403* (2013.01); *H04L 65/4007* (2013.01); *H04W 4/06* (2013.01)

(58) Field of Classification Search
CPC ... H04L 65/80; H04L 65/4007; H04L 65/403; H04W 4/06
See application file for complete search history.

(56) References Cited

U.S. PATENT DOCUMENTS 5,907,324 A * 5/1999 Larson ................ H04L 12/1822
715/753
8,194,840 B2 * 6/2012 Anglin ..................... H04M 3/56
379/202.01
(Continued)

FOREIGN PATENT DOCUMENTS

CN 108076003 A 5/2018
CN 109167802 A 1/2019

OTHER PUBLICATIONS

"A Cognitive Meeting Assistant Method Based on Intelligent Analysis", IP.com No. IPCOM000254084D, IP.com Electronic Publication Date: May 31, 2018, 4 pps., <https://priorart.ip.com/IPCOM/000254084>.
(Continued)

*Primary Examiner* — Khaled M Kassim
(74) *Attorney, Agent, or Firm* — David K. Mattheis; Maeve M. Carpenter (57) ABSTRACT A 5G network conference call initiation is detected. Information associated with the conference call includes a topic, an agenda, participants, and goals, is received. The respective participants of the conference call are identified, based on a dedicate traffic channel (DTCH) of the respective participants of the conference call. An allocation threshold of conference call contribution associated with the respective participants is determined, based on the information received. Contributions of respective participants are calculated during the conference call based on a list of DTCHs of the respective participants. The contributions of the respective participants are compared to the allocation threshold and responsive to determining that the contributions of a first participant of the respective participants of the conference call exceed the allocation threshold, an action mitigating the excessive contribution in the conference call is performed.

20 Claims, 4 Drawing Sheets (51) Int. Cl.
*H04L 65/401* (2022.01)
*H04L 65/403* (2022.01)
*H04W 4/06* (2009.01)

(56) References Cited

U.S. PATENT DOCUMENTS

| | | | | |
|---|---|---|---|---|
| 9,992,330 B1* | 6/2018 | Hodge | | H04M 3/38 |
| 10,142,485 B1 | 11/2018 | Haus | | |
| 10,805,365 B2* | 10/2020 | Bader-Natal | | H04L 65/403 |
| 2006/0178160 A1* | 8/2006 | Hans | | H04L 63/104 |
| | | | | 455/518 |
| 2009/0022080 A1* | 1/2009 | Edlund | | H04W 4/08 |
| | | | | 370/315 |
| 2009/0296909 A1* | 12/2009 | Anglin | | H04M 3/56 |
| | | | | 379/202.01 |
| 2010/0036697 A1* | 2/2010 | Kelnar | | G06Q 30/0283 |
| | | | | 705/7.11 |
| 2011/0055227 A1* | 3/2011 | Igarashi | | H04N 7/15 |
| | | | | 707/750 |
| 2011/0075820 A1* | 3/2011 | Mikan | | H04M 3/567 |
| | | | | 379/88.13 |
| 2011/0135082 A1* | 6/2011 | Lingafelt | | H04M 3/56 |
| | | | | 379/203.01 |
| 2011/0135083 A1* | 6/2011 | Lingafelt | | H04L 12/1822 |
| | | | | 379/203.01 |
| 2012/0224021 A1* | 9/2012 | Begeja | | H04N 7/155 |
| | | | | 348/14.08 |
| 2013/0144603 A1* | 6/2013 | Lord | | G06F 40/58 |
| | | | | 704/9 |
| 2014/0173701 A1* | 6/2014 | Albouyeh | | H04L 63/08 |
| | | | | 726/4 |
| 2014/0258413 A1* | 9/2014 | Brieskorn | | H04N 7/152 |
| | | | | 709/204 |
| 2015/0235240 A1 | 8/2015 | Chang | | |
| 2016/0014180 A1* | 1/2016 | Sun | | H04L 65/1083 |
| | | | | 348/14.08 |
| 2016/0072862 A1* | 3/2016 | Bader-Natal | | G06F 3/0482 |
| | | | | 715/755 |
| 2017/0243171 A1* | 8/2017 | Bellamy | | H04L 65/403 |
| 2018/0176384 A1* | 6/2018 | Waugh | | H04M 3/567 |
| 2018/0262716 A1* | 9/2018 | Kang | | G06K 9/00268 |
| 2018/0337963 A1* | 11/2018 | Faulkner | | H04L 67/26 |
| 2019/0088153 A1* | 3/2019 | Bader-Natal | | G09B 5/065 |
| 2019/0167185 A1* | 6/2019 | Komura | | A61M 21/00 |
| 2019/0197478 A1* | 6/2019 | Ferreira Moreno | | G06F 16/437 |
| 2019/0306101 A1* | 10/2019 | Synal | | H04L 65/1063 |
| 2020/0365172 A1* | 11/2020 | Takahashi | | G10L 25/78 |

OTHER PUBLICATIONS

"Conference Call Analytics to Generate Meeting Moderation Recommendations", IP.com No. PCOM000205838D, IP.com Electronic Publication Date: Apr. 5, 2011, 8 pps., <https://priorart.ip.com/IPCOM/000205838>.

"Optimizing Network Applications for 5G", ©Telefonaktiebolaget LM Ericsson 1994-2020, , Apr. 21, 2017, 10 pps., <https://www.ericsson.com/en/news/2017/4/optimizing-network-applications-for-5g>.

"Tools and Analytics to Improve Conference Call and Web Meeting Efficiency", IP.com No. IPCOM000245272D, IP.com Electronic Publication Date: Feb. 24, 2016, 3 pps., <https://priorart.ip.com/IPCOM/000245272>.

Abella, "3 Ways to Stop Someone Who Is Hijacking Your Meeting", Inc., May 27, 2020, 4 pps., <https://www.inc.com/amanda-abella/3-ways-to-stop-someone-who-is-hijacking-your-meeti.html>.

Rao et al., "Wipro's Play in 5G Conference Call", Wipro Limited, May 29, 2019, 22 pps.

* cited by examiner

CALL MANAGEMENT OF 5G CONFERENCE CALLS

FIELD OF THE INVENTION

The present invention relates generally to the field of telecommunications on a 5G network, and more particularly to performing mitigation in response to detection of excessive contribution to a conference call.

BACKGROUND OF THE INVENTION

Advancement in telecommunication technology has served as an enabler in many industries and other technological areas. Indeed, telecommunication advancement has transitioned stationary communications to a ubiquitous mobile experience and has provided near limitless data and information anytime and nearly anywhere. Fueling the progress in telecommunication advancement has been the progression of network capabilities from 3G to LTE, 4G, and now 5G network standards and technology. 5G technology promises to integrate into everyday life, provide faster and greater quantities of data exchange, and become an enabler of human-to-human, human-to-device, and device-to-device interactions.

In a 5G telecommunications network, services are provided from a medium access control (MAC) layer by logical channels to a control layer. The logical channels are virtualized communication network interfaces used to transfer commands and control instructions. Some logical channels are used as traffic channels of user data. 5G network slicing models are used to allow multiple channels over a single radio bearer network and may carry traffic from user equipment (UE) devices to the 5G network. In 5G networks, a dedicated logical channel is often used for conference calling with dedicated traffic channels created between participants of the conference call and the 5G network.

Conference calling has become a more common and cost-effective means of interaction and collaboration, and greater attention is given to making conference calls more results-oriented and effective.

SUMMARY

Embodiments of the present invention disclose a method, computer program product, and system. The embodiments include a method for conference call management on a 5G network. The method provides for one or more processors to receive a first set of information associated with a topic, an agenda, and goals of a conference call and a second set of information associated with respective participants of the conference call. The one or more processors identify the respective participants of the conference call, based on a dedicated traffic channel (DTCH) associated with the respective participants of the conference call. The one or more processors determine an allocation policy including a threshold of a contribution to the conference call associated with the respective participants, based on the first set of information and the second set of information. The one or more processors collect the contribution of the respective participants during the conference call by collecting a data stream associated with respective DTCHs of the respective participants. The one or more processors calculate the contribution of the respective participants to the conference call, and responsive to determining a condition in which a first participant exceeds a contribution allocation threshold of the conference call, based on the contribution to the conference call associated with the respective participants exceeding the allocation policy threshold, the one or more processors perform an action mitigating the condition of the first participant exceeding the contribution allocation threshold of the conference call.

DETAILED DESCRIPTION

Embodiments of the present invention recognize that fifth-generation (5G) telecommunications networks provide significantly faster and higher capacity network performance, creating and expanding opportunities involving greater data exchange enhanced with a wider range of services and applications. Remote teleconferencing services have been in use for years, and have advanced to include video, file sharing, and other collaborative features. Embodiments of the present invention recognize that teleconferencing instances often experience difficulty in which one or a small number of participants consume a significant amount of scheduled conference time and audio content, preventing other participants from more fully engaging, sharing knowledge, or posing relevant and important queries.

Embodiments also recognize that in some instances, the intended topic and purpose of the teleconference, hereafter for brevity referred to as a/the conference call, is ignored in favor of a different priority or a preferred topic of one or more participants, rendering the host's call ineffective and wasteful. Instances of conference call topic diversion or monopolizing conference call dialog by a participant are often referred to as the participant making excessive contributions to conference calls. A user making excessive contributions to a conference call can produce significant negative effects and attitudes towards an otherwise positive and effective use of technology.

Making excessive contributions to conference calls by dominating contribution content and time, also referred to herein as excessive contribution, is a condition in which a participant consumes a large portion of available conference time with dialog contribution disproportionate in contribution value and reduces or prevents participation time and diverse contributions from other conference call participants. The use of the terms "excessive contribution", herein, also include conditions in which a participant of the conference call diverges from an intended topic of the call. Embodiments of the present invention also recognize that one or more participants of a conference call may divert the conference call discussion to a topic different and unrelated to the intended topic of the host's scheduled conference call.

Embodiments of the present invention provide a method, computer program product, and computer system to detect conference call contributions based on information associated with the conference call, participants, host, and service orchestration available with 5G telecommunication technology. In some embodiments, call contribution detection includes accessing participant information associated with historic conference call behavior and contribution. In some embodiments, call contribution detection includes receiving information regarding a conference call's agenda, subject matter topic, and goals. Embodiments of the present invention include determining an allocation of contribution for participants, based on accessed and received information, and performing an action to mitigate the detected excessive contribution, such as notification to the host, publishing violation of contribution time or content allocation to the participants, muting the microphone of the violating party (and discontinuing video content from the contribution dominating party), and possibly disconnection of the violating participant.

In some embodiments, a call contribution program interacts with a user computing device to access a particular conference and provide authenticating identification of the participant joining the call. In some embodiments, call contribution management includes an over-ride function optionally available to the conference call host, extending or canceling allocation thresholds of the contribution of a respective participant of the conference call. In some embodiments, information is collected from various application programming interfaces (APIs) is used as a static computing platform and serves as a ground truth source for future information enhancement.

Figure 1:
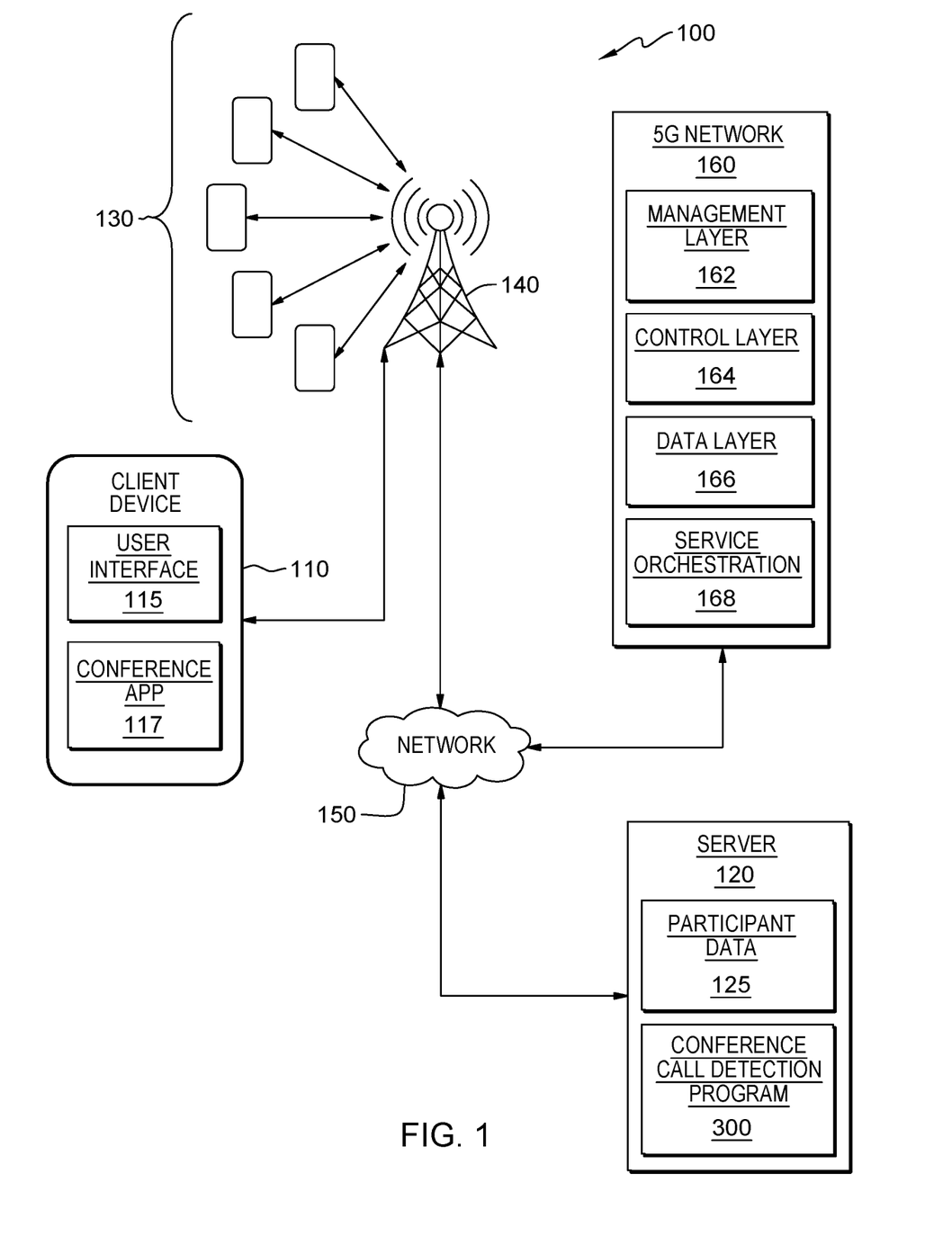
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed data processing environment 100 includes client device 110, server 120, participant devices 130, transceiver tower 140, and 5G network 160, all interconnected via network 150. Network 150 can be, for example, a local area network (LAN), a wide area network (WAN), such as the Internet, a virtual local area network (VLAN), or any combination that can include wired, wireless, or optical connections. Network 150 may be connected to or an integrated part of a 5G telecommunications network. In general, network 150 can be any combination of connections and protocols that will support communications between client device 110, server 120, participant devices 130, transceiver tower 140, and 5G network 160, in accordance with embodiments of the present invention.

Client device 110 is a mobile computing device capable of telecommunication transmission and reception. Client device 110 includes user interface 115 and application (App) 117. Client device 110 communicates wirelessly with 5G network 160 via transceiver tower 140 and network 150. In some embodiments, client device 110 may be a laptop computer, a tablet computer, a smartphone, smartwatch, a wearable computing device, or any programmable electronic mobile device capable of communicating with various components and devices within distributed data processing environment 100, via network 150. In general, client device 110 represents one or more programmable electronic devices or a combination of programmable electronic devices capable of executing machine-readable program instructions and communicating with participant devices 130, transceiver tower 140, server 120, and call contribution detection program 300, via network 150 and 5G network 160. Client device 110 may include internal and external hardware components, depicted in more detail in FIG. 4.

User interface 115 provides an interface to access the features and functions of client device 110. In some embodiments of the present invention, user interface 115 provides access to call contribution detection program 300, operating on server 120, and app 117. User interface 115 may also support access to other applications, features, and functions of client device 110 (not shown). In some embodiments, user interface 115 provides display output and input functions for client device 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of client device 110. User interface 115 enables respective users of client device 110 to receive, view, hear, and respond to input, access applications, display content of online conversational exchanges, and perform available functions.

Conference application (App) 117 is an application operating from an end-user client device and connects the client device to a conference call supported on a 5G network. In some embodiments of the present invention, conference app 117 is a separate application communicating with call contribution detection program 300 in a service layer of the 5G network and provides an inbound and outbound channel to the conference call. In other embodiments, conference app 117 is a module of call contribution detection program 300 downloaded and operating from client device 110. In some embodiments, if call contribution detection program 300 determines that the user of client device 110 has exceeded an allocation of participation or diverted the discussion from the predetermined topic and subject matter of the conference call, then conference app 117 receives notifications warning the user of client device 110 of excessive conference call contribution detection. In some embodiments, conference app 117 receives the notification and displays the notification to the user of client device 110 via user interface 115.

In some embodiments, conference app 117 connects with the conference call service and call contribution detection program 300 via a service orchestration layer of the 5G network, and conference app 117 connects to a service instance initiation activating data collector APIs. The data collector APIs include a gathering of information from entities in a service domain associated with the conference call and includes user equipment (UE), universally unique identifier (UUID), dedicated traffic channels (DTCHs), the bandwidth of DTCHs, and other information. The collection of information by the data collector APIs initiated by conference app 117 is received by call contribution detection program 300. Other API data collection initiated by conference app 117 may include user voice data, project or program-specific information, and personal history/behavior information of identified conference call participants.

Server 120 is depicted as including participant data 125 and call contribution detection program 300. Server 120 connects to service orchestration layer 168 and data layer 166 of 5G network 160 via network 150. In some embodiments, server 120 can be a web server, a blade server, a desktop computer, a laptop computer, a tablet computer, a netbook computer, or any other programmable electronic computing device capable of receiving, sending, and processing data, and communicating with features and functions of client device 110, app 117, 5G network 160 and participant devices 130, via transmission tower 190, within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 4.

Participant data 125 is a collection of information and data associated with participants of a conference call session. In some embodiments, participant data 125 includes respective participant information of historic conference calls including metrics of participation and contribution levels, history of likely behavior attributes during conference calls, and warnings and/or mitigation actions of the detected excessive conference call contributions. In some embodiments, participant data 125 also includes organization details, organization hierarchy, participant roles, responsibilities, expertise, and available situational data, such as time zone, and calendar data of participants.

Call contribution detection program 300 connects and interacts with conference app 117 and service orchestration 168 of 5G network 160. Call contribution detection program 300 determines service initiation of the conference call and receives data from participant data 125, client device 110, and participant devices 130 via conference app 117 and receives a project, program, organization, and calendar data associated with the conference call and the participants identified joining the conference call.

In some embodiments, call contribution detection program 300 obtains participant and conference call details from accessing the organization's email server (not shown). Call contribution detection program 300 parses the received information, saves the parsed information to metadata mapper objects, and classifies the information using 5G network 160's serial or parallel classifier. In some embodiments in which the conference call topic concerns a project or program, call contribution detection program 300 establishes secure communications with project management tools. Call contribution detection program 300 may perform additional authentication actions to access information from communications with the project management tools and may obtain project/program details such as timelines, task assignments, status, risks, work breakdown structure (WBS), and other project or program details.

Call contribution detection program 300 collects packet streams of all audio and video content from respective participants during the conference call. Attending members of the respective conference call are informed of the collection of conference call packet stream data at the initiation of the conference call and advised to disconnect if they disagree (opt-out) with the data collection. Conference call attendees can indicate a preference to opt-in or opt-out of conference call contribution data collection by profile preferences stored in participant data 125. The data collection service of a virtual network function (VNF) of 5G network 160 identifies the DTCH associated with collected packets and call contribution detection program 300 receives the information associating packets to the contributing participant of the conference call. Call contribution detection program 300 augments the DTCH and UUID information with traditional voice recognition to attribute conference call content to respective participants. In some embodiments, call contribution detection program 300 establishes a word count of content spoken for each participant of the conference call, whereas in other embodiments, call contribution detection program 300 tracks an accrued amount of time of contribution for participants, and in still other embodiments, call contribution detection program 300 tracks both word count and accrued time of participant contribution during the conference call.

Call contribution detection program 300 determines an allocation of contribution for each of the participants of the conference call by considering the collected information of participants and the conference call topic and details. In some embodiments, the expertise, experience, position role, organization hierarchy, and conference call history of participants is included and used to generate weights for allocation determination. Call contribution detection program 300 applies the generated weights and determines an allocation of participation level for the conference call participants. During the conference call, call contribution detection program 300 accumulates the words spoken by participants and the time associated with the participants' respective contributions and compares the accumulated word count and contribution time against the weighted allocations determined for respective participants.

If an allocation level is exceeded, call contribution detection program 300 enforces a policy quota of the allocations and generates a notification identifying the violation. In some embodiments, the notification is directed to the violating participant and the conference call host. In other embodiments, all participants are notified of the violation. In some embodiments, if a participant violating allocation limits of the conference call fails to comply with the notification and continues to provide content to the conference call, call contribution detection program 300 responds by muting the violating participant's microphone, disabling video delivery (if any) by the violating participant, and may disconnect the violating participant from the conference call.

Call contribution detection program 300 determines the topic and subject matter associated with the conference call, based on received details of the conference call and information from an email server of participants and project management tools. In some embodiments, call contribution detection program 300 generates a corpus of terms and phrases associated with the topic of the conference call. In some embodiments, the terms and phrases are extracted from information acquired from the conference call agenda and supporting document details, project management tools, email extractions, and online semantic dictionaries. Call contribution detection program 300 performs analysis of the words included in packet streams of the conference call for the respective participants and determines whether the content diverges from the stated topic and subject matter of the conference call. In response to determining the content of a participant has diverged from the topic of the conference call, call contribution detection program 300 generates a notification and transmits the notification to the conference call host and the participant determined to have diverged from the conference call topic. If the participant diverging from the topic fails to respond to the notification, call contribution detection program 300, based on the policy set by the conference call host, may mute the microphone of the participant. In some embodiments, the host of the conference call overrides the detection of divergence from the conference call topic and allows the participant to continue.

Allocations for participants consider the context of the participant, for example, an expert in risk management identification and mitigation would be weighted greater as a participant of a conference call with a topic on project risk management and would be allotted additional time compared to participants with much less experience on the topic. Additionally, it may be necessary for a participant to connect to the conference call from a location with conditions making it difficult to hear and to be heard clearly, and call contribution detection program 300 dynamically adjusts allocation levels to accommodate a need for repetition by speakers. In some cases, call contribution detection program 300 may determine from historic conference calls that a participant speaks very slowly and is thoughtful before responding and adjusts allocation levels to accommodate the participant's known participation behavior.

In some embodiments of the present invention, call contribution detection program 300 includes machine learning models (MLM) that are applied to the collected data and determine the situational context of the conference call details and participants. MLMs are trained by applying importance mapping of participant information of experience, expertise, role or position, organizational hierarchy, and conference call history to the conference call topic and information using supervised learning techniques. Call contribution detection program 300 performs a situational context assessment using cognitive analysis in the service orchestration layer of 5G network 160.

Participant devices 130 represents the communication devices of a plurality of participants of the conference call. Participant devices 130 are depicted as communicating wirelessly to transceiver tower 140 and connecting to 5G network 160 via network 150.

5G network 160 is a fifth-generation telecommunications network comprised of infrastructure and protocol components. 5G network 160 is depicted as including management layer 162, control layer 164, data layer 166, and service orchestration layer 168. Management layer 162 supports logical inter-slicing of network resources supporting domain-specific applications and services including virtual network function and physical network function management. Control layer 164 provides common and dedicated control applications for virtual network functions and physical network functions of data layer 166. Data layer 166 transports, supports, and enables data transmission across 5G network 160. Service orchestration layer 168 includes support systems, policy and decision functions as well as applications and API accessed services. Call contribution detection program 300 performs by connection to service orchestration layer 168.

Figure 2:
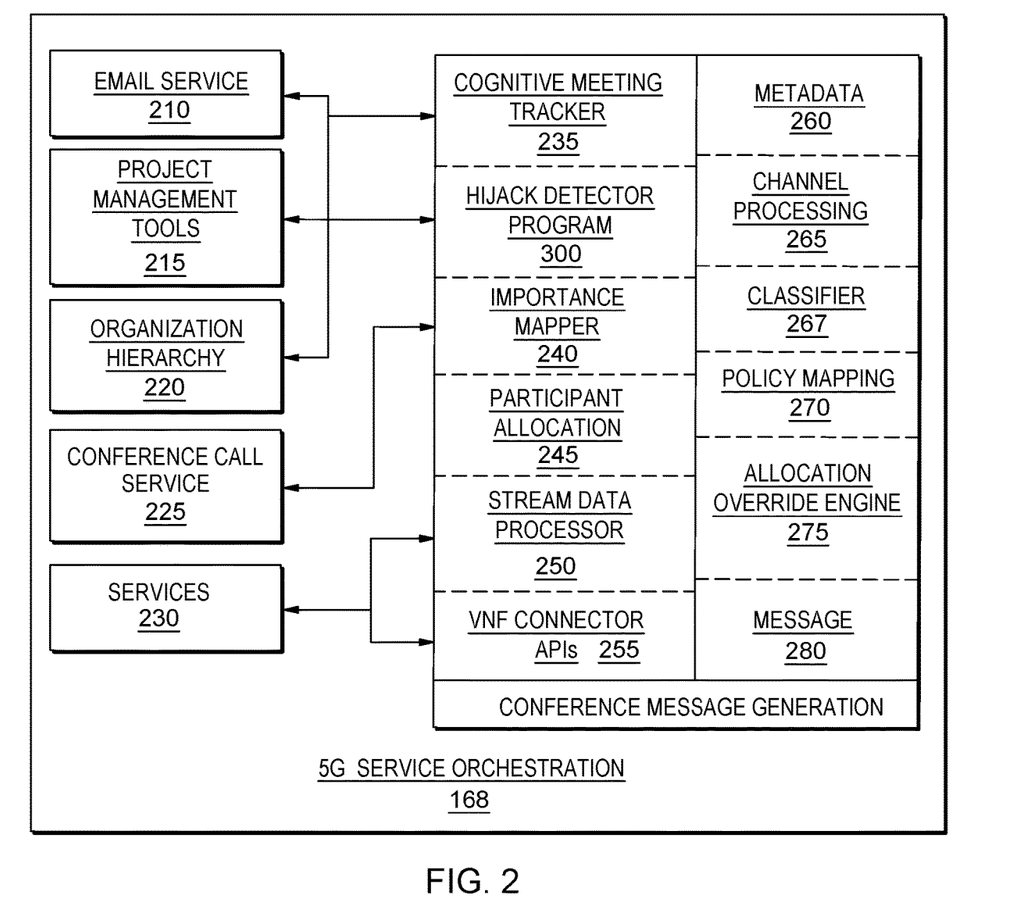
FIG. 2 is a diagram depicting details of a 5G service orchestration layer as a component of a 5G network, in accordance with embodiments of the present invention.

FIG. 2 is a diagram depicting details of 5G service orchestration 168 as a component of 5G network 160, in accordance with an embodiment of the present invention. 5G service orchestration 200 includes service connections to access information associated with the conference call, which includes email service 210, project management tools 215, organization hierarchy 220, conference call service 225, and services 230. 5G service orchestration 200 conference message generation includes cognitive meeting tracker 235, call contribution detection program 300 (in one embodiment operating from server 120), importance mapper 240, participant allocation 245, stream data processor 250, VNF connector APIs 255, metadata 260, channel processing 265, classifier 267, policy mapping 270, allocation override engine 275, and message 280.

Email service 210 is accessed by call contribution detection program 300 to obtain participant information relevant to the topic of the conference call, the role or position of participants relative to the topic, and schedules of the participants, among other information. For example, recent emails may include information regarding the conference call topic, agenda items, priorities, and objectives. Participant schedules may indicate conflicts that limit the participation of attendees and call contribution detection program 300 may make adjustments to participant allocations for the call.

Project management tools 215 includes documents, information, and data associated with one or more particular projects or programs. Project management tools 215 is accessed to obtain information corresponding to a topic or subject matter of a conference call or component agenda items of a conference call. In some embodiments, an additional authentication step is required to access the information from project management tools 215, and authentication can be manually performed by the conference call host or included in service access transactions of call contribution detection program 300. Information received from project management tools 215 may include, for example, project name/title, project schedule, project status, project tasks, task owners, project risk assessment, WBS, and project financial information. Project management tools 215 may also include information about related and similar projects that include topics and context of the subject matter of the conference call. In some embodiments, project management tools 215 includes a repository of project management information.

Organization hierarchy 220 includes information descriptive of the structure of the organization including positions and report-to relationships. Organization hierarchy 220 includes information pertinent to decision making and may be applied in determining participation allocations for the conference call.

Conference call service 225 includes capturing the universally unique identification (UUID) of participant devices connecting to the conference call and may perform authentication of participants. In some embodiments, conference call service 225 feeds participant identification and information to importance mapper 240 as a component of determining participants' contribution allocations. Conference call service 225 provides the service connecting all participants and enabling conference call features. In some embodiments, initiation of conference call service 225 triggers call contribution detection program 300 to access information collecting services.

Services 230 includes services that trigger call contribution detection program 300 in response to initiation of the conference call.

Cognitive meeting tracker 235 is a meeting management system that takes input from host and participant calendars and generates meeting schedules. Cognitive meeting tracker 235 generates a meeting schedule, notices, and invitations using specific formats. Cognitive meeting tracker 235 identifies meeting subject matter and identifies and determines online connection to meeting participants.

Importance mapper 240 receives input and information from conference call service 225 and applies the information to respective participants based on the UUID of the users' device. Importance mapper 240 maps participant association and expertise to particular subject matters and maintains the information for participant allocation 245. Importance mapper 240 includes information applied to allow greater allocation of participation during conference calls and online meetings without triggering excessive contribution mitigating actions.

Participant allocation 245 is a component of call contribution detection program 300 that generates weight considerations based on received participant and conference call information in determining the allocation of contribution for the conference call. For example, information received that indicates a participant has considerable experience and expertise related to the topic and subject matter of the conference call would result in participation allocation 245 providing the participant more contribution time for the conference call and other participants with less expertise and experience, less contribution time.

Stream data processor 250 is a collection of data processors that classify parallel stream data. Stream data processor 250 receives the conference call data stream from a data collector service of services 230 and applies the parallel stream data classification.

VNF Connector APIs 255 is a set of application programming interfaces connecting services to 5G service orchestration 200 by virtual network functions. The service connections enable conference calling services and enable call contribution detection program 300 to receive the data stream and perform excessive contribution notifications and actions.

Metadata 260 stores the information collected from client device 110, participant devices 130, email servers of the organization associated with the conference call, conference call history and, if applicable, project management tools.

Channel processing 265 supports and manages data transmission over the 5G network. Channel processing 265 determines the dedicated traffic channel (DTCH) associated with each UUID of participant devices connected to the conference call. Channel processing 265 enables the participant contributions during the conference call to be associated with the source participant and enable tracking of time and word count towards allocations.

Classifier 267 includes a set of data parsing techniques that are used to extract the information transmitted over the 5G network. The information may include meeting agendas, organizational reporting chains, or identify participants attending the meeting. Data communicated and transmitted across the 5G network that originates from external interfaces is parsed utilizing classifier parsing techniques to transform the information into a consumable format.

Policy mapping 270 is a set of configuration setting policies that include a definition of allocation violation, warnings, notifications, and actions to take regarding the detection of excessive contribution of conference calls. Policy mapping 270 may configure an allocation to a particular meeting attendee to speak no more than 1000 words in a conference call, or each attendee may be allocated an equal quota of contribution during the meeting. The policy information is saved in a configuration file and selected with respect to a conference call instance. Policy mapping 270 may operate in conjunction with Allocation override engine 275.

Allocation override engine 275 enables the host to override the predetermined policy of contribution allocation limits and deviation detection from the topic of the conference call. Allocation override engine 275 can be manually asserted by the host or may be a conditional override response determined by dynamic conditions during the conference call, such as weather conditions, noise level conditions, or behavioral attributes associated with a participant.

Message 280 is generated in response to a participant of the conference call exceeding an allocated time of contribution or word count, and in response to determining a deviation from the topic or subject matter of the conference call.

Figure 3:
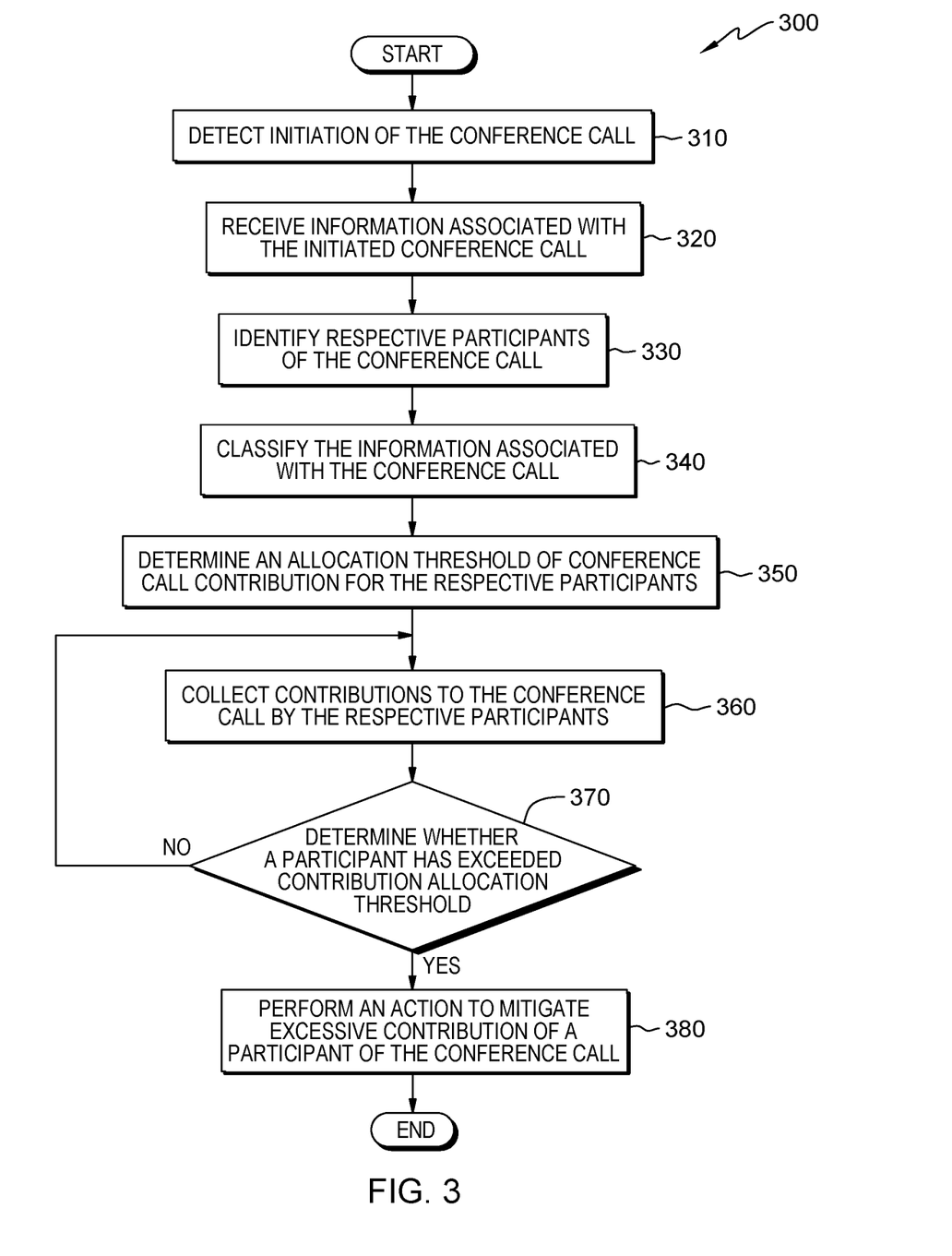
FIG. 3 is a flowchart depicting operational steps of a call contribution detection program, operating in the distributed data processing environment of FIG. 1, in accordance with embodiments of the present invention.

FIG. 3 is a flowchart depicting operational steps of call contribution detection program 300, operating in distributed data processing environment 100 of FIG. 1, in accordance with embodiments of the present invention. In embodiments of the present invention, call contribution detection program 300 determines whether a participant of a conference call on a 5G network is overly active in contributing to the call or whether discussion on the conference call has deviated from the designated topic; conditions that are often referred to as making excessive contributions to a conference call. Call contribution detection program 300 determines conditions of excessive contribution of the conference call, based on participants violating a predetermined allocation of contribution to the call, based on gathered information regarding the conference call and participants, or detecting discussion topic deviating from a designated subject matter.

Call contribution detection program 300 detects the initiation of the conference call (step 310). In some embodiments, a service instance is initiated for the conference call. The service instance may be triggered by a participant or the host making a connection to the conference call service. Call contribution detection program 300 detects the initiation of the conference call and allocates memory and resources to receive information.

Call contribution detection program 300 receives information associated with the initiated conference call (step 320). Call contribution detection program 300 operates with a connection to the service orchestration layer of a 5G telecommunication network and is initiated by the conference calling application. Call contribution detection program 300 connects with data collection APIs and receives information associated with the conference call and the participants of the conference call. The information received by call contribution detection program 300 includes the user equipment (UE), universally unique identification (UUID) of the participants' devices, dedicated traffic channels of the participant devices connecting with the 5G network. Call contribution detection program 300 may receive additional information from email servers, project management tools, documents associated with the conference call. In some embodiments, the information also includes organization hierarchy, participant organizational role, participant experience and expertise, participant's conference call insights, and conference call agenda.

For example, call contribution detection program 300 connects with service APIs to access and receive information associated with the conference call. Call contribution detection program 300 receives information that includes participant identification and conference call title, topic, and agenda. Call contribution detection program 300 accesses and receives information including the UUID and DTCHs of participants calling into the 5G network conference call, and receives information from email servers, organizational hierarchy, and project management tools regarding details of the conference call topic and conference call participants.

Call contribution detection program 300 identifies respective participants of the conference call (step 330). In some embodiments of the present invention, call contribution detection program 300 identifies participants by the universally unique identification (UUID) of the device used to connect to the conference call. In some embodiments, as a participant is identified, call contribution detection program 300, using service API connections, accesses and receives information particular to the respective participant, such as email content, organizational role/position, expertise, experience, and conference call history information. One of average skill in the art will recognize that the receipt of conference call participant information and identification of conference call participants are interdependent, however, information about the conference call topic, agenda, history, and objectives, as well as project management tool information, may be received independent of identification of the participants of the conference call.

For example, a first participant of the conference call initiates a connection to the conference call service, which obtains the UUID of the first participant's calling device from UUID mappers in the 5G domain-level services and associates the UUID with the calling first participant. The first participant connects to the 5G network conference call via a dedicated traffic channel (DTCH) identification unique to the first participant and designated for the conference call. Call contribution detection program 300 can utilize a listing of DTCHs to track the participants of the conference call and voice recognition is applied to assign verbal contribution during the conference call to a particular participant. Call contribution detection program 300 uses the identification of the first participant to access a service API to receive information including the first participant's organization role, previous projects, experience, areas of expertise, current projects, and previous conference call insights. Call contribution detection program 300 performs similar identification of other participants of the conference call enabling access and receipt of information corresponding to the other participants of the conference call.

Call contribution detection program 300 classifies the information associated with the conference call (step 340). In some embodiments, the collection of information associated with the conference call utilizes the 5G service programmability interface and multi-domain orchestration framework, which includes a plurality of machine learning models enlisted to classify the information received. Call contribution detection program 300 includes one or more machine learning models that apply serial and parallel classification techniques to classify the received information which is parsed and saved into metadata mapper objects.

Call contribution detection program 300 determines an allocation threshold of conference call contribution for the respective participants (step 350). Call contribution detection program 300 uses the conference call participant information collected and the topic, agenda, and goals of the conference call to determine a participant-based allocation policy. The allocation policy defines a threshold for each of the participants of the conference call. Call contribution detection program 300 includes consideration of participants having higher levels of expertise, experience, role, organization position, or history corresponding to the conference call topic and agenda items in determining an allocation threshold for the respective participants. In some embodiments, the conference call host can adjust allocations to participants, and in other embodiments, the call contribution detection program 300 includes an allocation override function available to the conference call host.

For example, call contribution detection program 300 utilizes the classification of information received regarding the conference call topic, agenda, and goals, as well as the information associated with participants of the conference call, and determines an allocation threshold for each of the participants. The threshold may include a word count or time limit of speaking by each participant. Call contribution detection program 300 may assign a higher weighted value to participant information indicating attributes aligned with the topic or agenda items associated with the conference call, such as expertise, experience, history, organization role, and organization hierarchy. Call contribution detection program 300 increases an allocation threshold for participants determined to have a higher weighted value assigned, based on information received. Additionally, call contribution detection program 300 provides the conference call host with an override functionality of allocation policy, enabling the host to change allocation thresholds, remove thresholds, and adjust enforcement of threshold violations.

Call contribution detection program 300 collects conference call contributions from the respective participants (step 360). In some embodiments of the present invention, the conference call may be entirely an audio input telecommunications event in which participants provide contributions by speaking and the spoken content is shared with the other participants of the call. In other embodiments, the "conference call" may include video stream input from each of the participants, which may be presented as an image video of the respective participants, and allow documents and other visual content to be contributed to the conference call and shared with other participants. The input of audio and/or video content is collectively referred to, herein, as a contribution to the conference call.

Call contribution detection program 300 receives a data stream of audio and, if included, video content contributed to the conference call by the participants. Call contribution detection program 300 determines the source participant of the content stream packets and assigns the contribution to the respective participant, enabling tracking of contribution toward assigned allocation policies. In some embodiments, call contribution detection program 300 aggregates the word count and/or time accumulation of content contribution by respective participants during the conference call.

In some embodiments, call contribution detection program 300 monitors the contribution to the conference call by participants, determining whether the terms and phrases of the content are aligned or in context with the topic, subject matter, and agenda of the conference call. In some embodiments, call contribution detection program 300 accesses semantic database resources to determine terms and phrases corresponding to the topic, subject matter, and agenda of the conference call towards determining whether the participant contribution is in context of the conference call topic, subject matter, and agenda.

For example, call contribution detection program 300 receives content from a participant connecting to the conference call via client device 110 and conference app 117. The participant speaks on the conference call offering various contributions and call contribution detection program 300 determines the word count of content spoken by the participant and aggregates the word count against an assigned threshold of the allocation policy. Call contribution detection program 300 identifies the participant by applying vocal recognition techniques and determining the UUID of the device and the DTCH of the user connected to the conference call. Additionally, call contribution detection program 300 monitors the content contributions, determining the context of the terms and phrases with respect to the topic, subject matter, and agenda of the conference call.

Call contribution detection program 300 determines whether a participant has exceeded a contribution allocation threshold (decision step 370). Call contribution detection program 300 detects the excessive contribution to the conference call by determining whether the contribution by a participant has exceeded an allocation threshold for the conference call, or by comparing the aggregated word count of contributions by each participant of the conference call to the allocation policy and allocation thresholds assigned to each participant of the conference call. In some embodiments, call contribution detection program 300 determines whether the allocation threshold of a participant has been exceeded, such as determining whether a word count or accrued time speaking or contributing content to the conference call exceeds an established word count or accrued time threshold. In other embodiments, call contribution detection program 300 determines whether the context of the contributions by participants has diverged from the topic, subject matter, and agenda of the conference call.

For the case in which call contribution detection program 300 determines that no participants have exceeded the contribution threshold of the conference call (step 370, "NO" branch), call contribution detection program 300 continues to collect contribution to the conference call by respective participants (step 360) and proceeds as described above.

For the case in which call contribution detection program 300 determines that a participant has exceeded the contribution allocation threshold of the conference call (step 370, "YES" branch), call contribution detection program 300 performs an action to mitigate excessive contribution of a participant of the conference call (step 380). In some embodiments of the present invention, call contribution detection program 300 identifies the participant determined as providing excessive contribution the conference call and generates a notification warning the participant to maintain a listening role allowing the opportunity for other participants to contribute. Call contribution detection program 300 may send the notification to client device 110, via conference app 117 and displayed on user interface 115. In some embodiments, call contribution detection program 300 may generate and share an announcement with all participants of the conference call that the allocation threshold of contribution time or contribution content (e.g. word count) has been exceeded by the participant determined as excessively contributing to the conference call, and may include a warning for the participant to yield to other participants on the conference call.

In some embodiments, call contribution detection program 300 determines that the contribution by one or more participants lacks context to the topic, subject matter, and agenda of the conference call, and interrupts the conference call with a notification (text or audio) that the content being contributed has diverged from the intended topic, subject matter, and agenda of the conference call, and instruct participants to redirect conference call contributions. In some embodiments, allocation policies may include mitigating actions that determine whether the participant violating allocation thresholds or diverting contribution away from conference call topics has responded and complied with the mitigating notifications. In some embodiments, the allocation policy of call contribution detection program 300 escalates mitigating actions for participants not complying with notifications that allocation thresholds have been exceeded (or contributions have diverged from the context of the conference call topic) by muting the microphone of the participant, and in more extreme cases, disconnects the participant from the conference call.

Subsequent to the conclusion of the conference call, call contribution detection program 300 ends.

Figure 4:
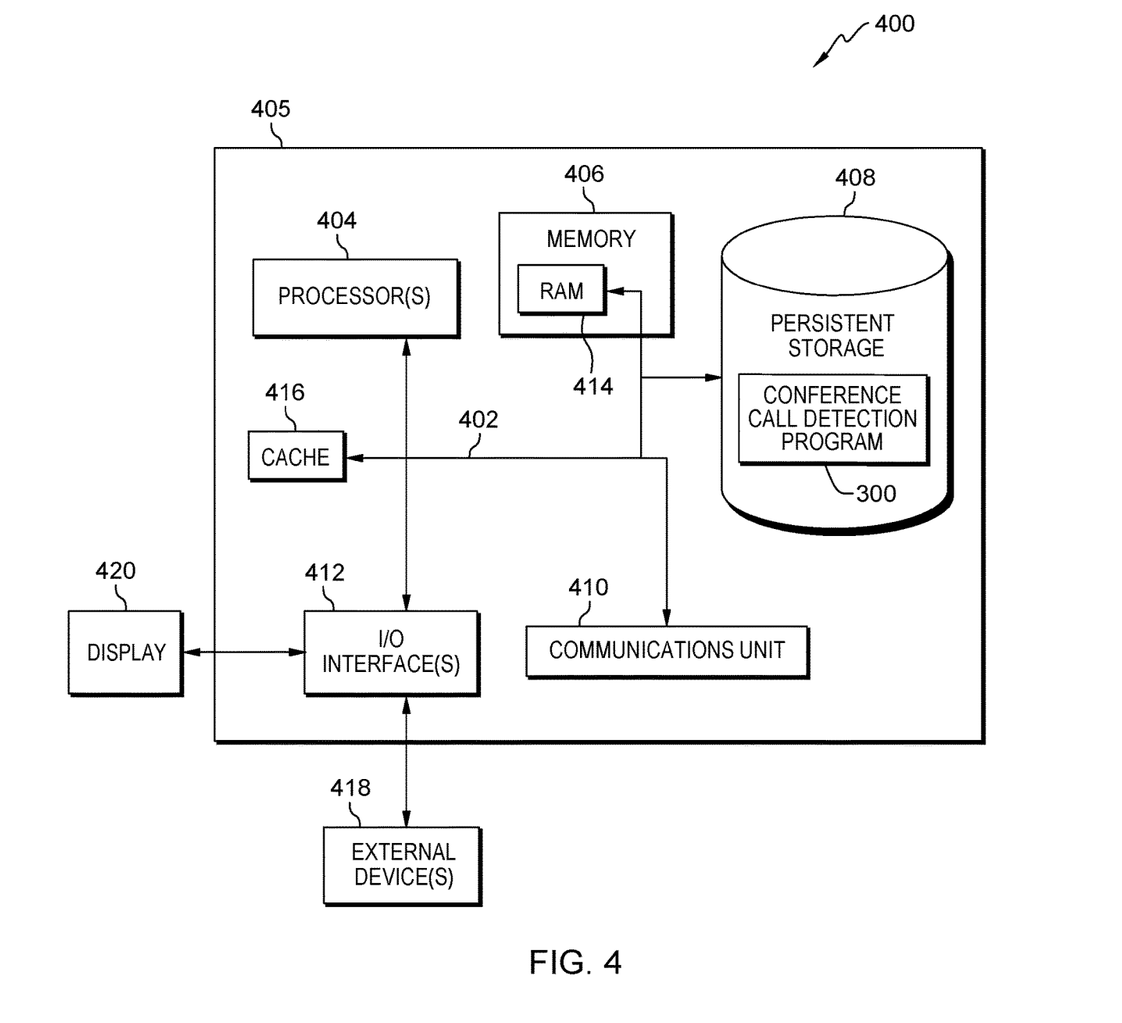
FIG. 4 depicts a block diagram of components of a computing system, including a computing device configured to operationally perform the call contribution detection program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform call contribution detection program 300 of FIG. 3, in accordance with an embodiment of the present invention.

Computing device 405 includes components and functional capability similar to components of server 120, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, call contribution detection program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Call contribution detection program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., call contribution detection program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for conference call management on a 5G network, the method comprising:

receiving, by the one or more processors, a first set of information associated with a topic, an agenda, and goals of a conference call and a second set of information associated with respective participants of the conference call;

identifying, by the one or more processors, the respective participants of the conference call, based on associating a universally unique identifier (UUID) and a dedicated traffic channel (DTCH) with the respective participants of the conference call;

determining, by the one or more processors, an allocation policy including a threshold of a contribution of content to the conference call associated with the respective participants, based on the first set of information and the second set of information;

collecting, by the one or more processors, the contribution of content of the respective participants during the conference call by collecting a data stream associated with respective DTCHs of the respective participants;

comparing, by the one or more processors, the contribution of content of the respective participants during the conference call to the threshold of the contribution of content of the allocation policy; and responsive to determining a condition in which a first participant exceeds a contribution allocation threshold of the conference call, based on the contribution of content to the conference call associated with the respective participants exceeding the allocation policy threshold, performing, by the one or more processors, an action mitigating the condition of the first participant exceeding the contribution allocation threshold of the conference call.

2. The method of claim 1, wherein collecting the contributions of content of the respective participants of the conference call includes aggregating input to the conference call for respective participants into a word count, and comparing the word count of the respective participants to the threshold of the allocation policy determined for the respective participants.

3. The method of claim 1, further comprising:

performing, by the one or more processors, a semantic analysis of words and phrases of the contributions of content by the respective participants of the conference call;

determining, by the one or more processors, a divergence of the contributions of content of the respective participants of the conference call from the topic, the agenda, and the goals of the conference call, based on the semantic analysis of the words and phrases of the contributions of content by the respective participants of the conference call; and determining, by the one or more processors, whether the contributions of content of the respective participants of the conference call that diverge from the topic, the agenda, and the goals of the conference call violate the allocation policy.

4. The method of claim 1, wherein identification of the respective participants of the conference call is determined in combination with utilizing voice recognition techniques.

5. The method of claim 1, wherein the allocation policy is adjustable by a conference call host.

6. The method of claim 1, further comprising:

accessing, by the one or more processors, a service application programming interface (API) connecting to an email server associated with a participant of the respective participants of the conference call; and accessing, by the one or more processors, a service API connecting to a repository of project management information associated with the topic, the agenda, and the goals of the conference call.

7. The method of claim 1, further comprising:

classifying, by the one or more processors, the first set of information and the second set of information using one of a 5G network serial classifier and parallel classifier.

8. The method of claim 1, wherein the second set of information associated with respective participants includes expertise levels of participants with respect to the topic, the agenda, and the goals of the conference call and an organizational hierarchy associated with the participants of the conference call.

9. A computer system for conference call management on a 5G network, the computer system comprising:

one or more computer processors;

one or more computer-readable storage media;

program instructions stored on the one or more computer-readable storage media, the program instructions comprising:

program instructions to receive a first set of information associated with a topic, an agenda, and goals of a conference call and a second set of information associated with respective participants of the conference call;

program instructions to identify the respective participants of the conference call, based on associating a universally unique identifier (UUID) and a dedicated traffic channel (DTCH) with the respective participants of the conference call;

program instructions to determine an allocation policy including a threshold of contribution of content to the conference call associated with the respective participants, based on the first set of information and the second set of information;

program instructions to collect the contribution of content of the respective participants during the conference call by collecting a data stream associated with respective DTCHs of the respective participants;

program instructions to compare the contribution of content of the respective participants during the conference call to the threshold of the contribution of content of the allocation policy; and responsive to determining a condition in which a first participant exceeds a contribution allocation threshold of the conference call, based on the contribution of content to the conference call associated with the respective participants exceeding the allocation policy threshold, program instructions to perform an action mitigating the condition of the first participant exceeding the contribution allocation threshold of the conference call.

10. The computer system of claim 9, wherein the contributions of content of the respective participants include aggregating audio input to the conference call into a word count of the respective participants, and comparing the word count of the respective participants to the threshold of the allocation policy determined for the respective participants.

11. The computer system of claim 9, further comprising:
program instructions to perform a semantic analysis of words and phrases of the contributions of content by the respective participants of the conference call;
program instructions to determine a divergence of the contributions of content of the respective participants of the conference call from the topic, the agenda, and the goals of the conference call, based on the semantic analysis of the words and phrases of the contributions of content by the respective participants of the conference call; and
program instructions to determine whether the contributions of content of the respective participants of the conference call that diverge from the topic, the agenda, and the goals of the conference call violate the allocation policy.

12. The computer system of claim 9, wherein identification of the respective participants of the conference call is determined in combination with utilizing voice recognition techniques.

13. The computer system of claim 9, further comprising:
program instructions to access a service application programming interface (API) connecting to an email server associated with a participant of the respective participants of the conference call; and
program instructions to access a service API connecting to a repository of project management information associated with the topic, the agenda, and the goals of the conference call.

14. The computer system of claim 9, wherein the second set of information associated with respective participants includes expertise levels of participants with respect to the topic, the agenda, and the goals of the conference call and an organizational hierarchy associated with the participants of the conference call.

15. A computer program product for conference call management on a 5G network, the computer program product comprising:
one or more computer-readable storage media;
program instructions stored on the one or more computer-readable storage media, the program instructions comprising:
program instructions to receive a first set of information associated with a topic, an agenda, and goals of a conference call and a second set of information associated with respective participants of the conference call;
program instructions to identify the respective participants of the conference call, based on associating a universally unique identifier (UUID) and a dedicated traffic channel (DTCH) with the respective participants of the conference call;
program instructions to determine an allocation policy including threshold of a contribution of content to the conference call associated with the respective participants, based on the first set of information and the second set of information;
program instructions to collect the contribution of content of the respective participants during the conference call by collecting a data stream associated with respective DTCHs of the respective participants;
program instructions to compare the contribution of content of the respective participants during the conference call to the threshold of the contribution of content of the allocation policy; and
responsive to determining a condition in which a first participant exceeds a contribution allocation threshold of the conference call, based on the contribution of content to the conference call associated with the respective participants exceeding the allocation policy threshold, program instructions to perform an action mitigating the condition of the first participant exceeding the contribution allocation threshold of the conference call.

16. The computer program product of claim 15, wherein program instructions to collect the contributions of content of the respective participants include collecting audio input to the conference call into a word count of the respective participants, and comparing the word count of a respective participant to the threshold of the allocation policy determined for the respective participant.

17. The computer program product of claim 15, further comprising:
program instructions to perform a semantic analysis of words and phrases of the contributions of content by the respective participants of the conference call;
program instructions to determine a divergence of the contributions of content of the respective participants of the conference call from the topic, the agenda, and the goals of the conference call, based on the semantic analysis of the words and phrases of the contributions of content by the respective participants of the conference call; and
program instructions to determine whether the contributions of content of the respective participants of the conference call that diverge from the topic, the agenda, and the goals of the conference call violate the allocation policy.

18. The computer program product of claim 15, wherein the allocation policy is adjustable by a conference call host.

19. The computer program product of claim 15, further comprising:
program instructions to classify the first set of information and the second set of information using one of a 5G network serial classifier and parallel classifier.

20. The computer program product of claim 15, wherein the second set of information associated with respective participants includes expertise levels of participants with respect to the topic, the agenda, and the goals of the conference call and an organizational hierarchy associated with the participants of the conference call.

* * * * *